United States Patent
Matsuda (10) Patent No.: US 8,391,855 B2
(45) Date of Patent: *Mar. 5, 2013

(54) MAIL OPERATION APPARATUS WITH SHORT RANGE WIRELESS COMMUNICATIONS FUNCTION

(75) Inventor: Naoki Matsuda, Anjo (JP)

(73) Assignee: Denso Corporation, Kariya (JP)

(*) Notice: Subject to any disclaimer, the term of this patent is extended or adjusted under 35 U.S.C. 154(b) by 436 days.

This patent is subject to a terminal disclaimer.

(21) Appl. No.: 12/799,906

(22) Filed: May 4, 2010

(65) Prior Publication Data

US 2010/0285798 A1    Nov. 11, 2010

(30) Foreign Application Priority Data

May 11, 2009  (JP) ................................. 2009-114556

(51) Int. Cl.
*H04W 4/00*  (2009.01)
(52) U.S. Cl. ............... 455/426.1; 455/569.2; 455/435.1; 455/41.1; 455/41.2; 455/41.3
(58) Field of Classification Search .............. 455/569.2, 455/426, 426.1, 435.1, 41.1, 41.2, 41.3; 709/206, 709/232, 229
See application file for complete search history.

(56) References Cited

U.S. PATENT DOCUMENTS

| 8,175,657 | B2* | 5/2012 | Okayasu ................. 455/569.2 |
| 2006/0079182 | A1 | 4/2006 | Matsuda |
| 2008/0032752 | A1 | 2/2008 | Tamura |

FOREIGN PATENT DOCUMENTS

| JP | 2002-176486 | | 6/2002 |
| JP | 2004-252563 | * | 9/2004 |
| JP | 2006-020097 | | 1/2006 |
| JP | 2006-033377 | * | 2/2006 |
| JP | 2006-148864 | | 6/2006 |
| JP | 2006-186908 | | 7/2006 |

OTHER PUBLICATIONS

Office action dated Aug. 9, 2011 from corresponding Japanese Application No. 2009-114556.

* cited by examiner

*Primary Examiner* — Kamran Afshar
*Assistant Examiner* — Manpreet Matharu
(74) *Attorney, Agent, or Firm* — Harness, Dickey & Pierce, PLC (57) ABSTRACT

Immediately after making connection of a Bluetooth communications link with a cellular phone, an in-vehicle handsfree apparatus makes connection of a handsfree phone call protocol while not making connection of a massage access profile. When a start trigger that an arrival of an electronic mail from a communications network then arises in the cellular phone, the in-vehicle handsfree apparatus makes connection of the message access profile with the cellular phone, thereby enabling a transfer of information of the mail from the cellular phone 3 by using a data transfer function of the message access profile if the cellular phone undergoing the arrival of the mail is a model compliant with the message access profile.

6 Claims, 4 Drawing Sheets

MAIL OPERATION APPARATUS WITH SHORT RANGE WIRELESS COMMUNICATIONS FUNCTION

CROSS REFERENCE TO RELATED APPLICATION

The present application is based on and incorporates herein by reference Japanese Patent Application No. 2009-114556 filed on May 11, 2009.

FIELD OF THE INVENTION

The present invention relates to a mail operation apparatus having a short range wireless communications function to make connection of several protocols including a mail transfer protocol with a cellular phone. The mail transfer protocol enables a transfer of an electronic mail from the cellular phone to the mail operation apparatus when the mail from a communications network is received by the cellular phone.

BACKGROUND OF THE INVENTION

[Patent document 1] JP-2004-252563 A
[Patent document 2] JP-2006-33377 A

Patent documents 1, 2 recite a short range wireless communications technology such as Bluetooth communications (Bluetooth is a registered trademark, and referred to as BT) to perform mail transfer from a cellular phone to an in-vehicle apparatus. For instance, the cellular phone and the in-vehicle apparatus establish a short range wireless communications link with each other; then, the cellular phone receives an electronic mail from a communications network. In such a case, mail information regarding the electronic mail received by the cellular phone is transferred to the in-vehicle apparatus. The mail information includes an arrival time and date, a mail source, a subject name, and a text body.

There is developed a message access profile (MAP) to enable a transfer of mail information from a cellular phone to an in-vehicle apparatus for realizing a mail transfer, which is defined by the communications standard of BT. In contrast, there is widely used a handsfree profile (HFP) to enable a handsfree phone call, which is defined by the communications standard of BT. This is because the handsfree phone call is a main usage of the cellular phone in a vehicle compartment.

From such a situation, a multi-connection (or concurrent connection) of simultaneously making connection of HFP and MAP between a cellular phone and an in-vehicle apparatus has been considered so as to enable a transfer of mail information from the cellular phone to the in-vehicle apparatus with respect to the electronic mail received from the communications network even when the cellular phone is under the handsfree phone call with the in-vehicle apparatus. However, such a configuration to establish concurrent connection of several protocols constantly poses an issue to increase a power consumption in both the cellular phone and in-vehicle apparatus. The issue, in particular, affects the cellular phone, which uses as an operating power an electric power from an internal battery.

SUMMARY OF THE INVENTION

The present invention is made in view of the above-mentioned situation. It is an object of the present invention to provide a mail operation apparatus with a short range wireless communications function with a cellular phone. The mail operation apparatus enables the cellular phone to appropriately transfer mail information of an electronic mail, which is received from a communications network, to the in-vehicle apparatus while reducing power consumption in both the cellular phone and in-vehicle apparatus.

To achieve the above object, according to an example of the present invention, a mail operation apparatus with a short range communications function is provided as follows. A communications link connecting device is configured that makes connection of a short range wireless communications link with a cellular phone. A protocol connecting device is configured that makes, with the cellular phone, connection of a plurality of protocols under a condition that the short range communications link is made between the communications link connecting device and the cellular phone, the plurality of protocols including a mail transfer protocol to enable a transfer of mail information of a mail which the cellular phone receives from a communications network. A control circuit is configured that controls making and disrupting of the connection of the plurality of protocols between the protocol connecting device and the cellular phone. Herein, the control circuit is further configured, (i) immediately after the short range wireless communications link is made between the communications link connecting device and the cellular phone, to make connection of an other protocol other than the mail transfer protocol between the protocol connecting device and the cellular phone without making the connection of the mail transfer protocol between the protocol connecting device and the cellular phone, and (ii) when a start trigger then occurs in the cellular phone posterior to the making the connection of the other protocol, the start trigger being an arrival of a mail from the communications network, to make connection of the mail transfer protocol between the protocol connecting device and the cellular phone, thereby enabling a transfer of mail information of the mail from the cellular phone using a data transfer function of the mail transfer protocol, if the cellular phone undergoing the arrival of the mail is a model compliant with the mail transfer protocol.

Thus, the above configuration is different from a conventional configuration, in which immediately after the short range wireless communications link is made with the cellular phone, concurrent connection of several protocols is made. In the above configuration of the example, the power consumption can be suppressed in both the cellular phone and the mail operation apparatus by an amount corresponding to an event that the connection of the mail transfer protocol is not made immediately after the short range wireless communications link is made with the cellular phone. Further, when a start trigger of an arrival of an electronic mail from the communications network then occurs in the cellular phone, the connection of the mail transfer protocol is made. Thus the mail information concerning the electronic mail arriving at the cellular phone from the communications network can be appropriately transmitted from the cellular phone to the mail operation apparatus.

According to another example of the present invention, a method is provided to be executed by a control circuit of an in-vehicle handsfree apparatus with a short range communications function. Herein, the handsfree apparatus has: (i) a communications link connecting device that makes connection of a short range wireless communications link with a cellular phone; (ii) a protocol connecting device that makes, with the cellular phone, connection of a plurality of protocols under a condition that the short range communications link is made between the communications link connecting device and the cellular phone, the plurality of protocols including a mail transfer protocol to enable a transfer of mail information of a mail which the cellular phone receives from a communications network; and (iii) a control circuit that controls making and disrupting of the connection of the plurality of protocols between the protocol connecting device and the cellular phone. The method comprises: (i) making connection of a handsfree phone call protocol other than the mail transfer protocol between the protocol connecting device and the cellular phone without making the connection of the mail transfer protocol between the protocol connecting device and the cellular phone immediately after the short range wireless communications link is made between the communications link connecting device and the cellular phone, and (ii) making, if the cellular phone undergoing the arrival of the mail is a model compliant with the mail transfer protocol, connection of the mail transfer protocol between the protocol connecting device and the cellular phone when a start trigger occurs in the cellular phone posterior to the making the connection of the handsfree phone call protocol, the start trigger being an arrival of a mail from the communications network, thereby enabling a transfer of mail information of the mail from the cellular phone using a data transfer function of the mail transfer protocol.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

An embodiment is explained with reference to drawings. In the embodiment, a mail operation apparatus with a short range wireless communications function according to the present invention is directed to an in-vehicle handsfree apparatus having a Bluetooth (registered trademark, referred to as BT) communications function. The following is explained on the assumption that a cellular phone having a BT communications function (also referred to a BT-enabled cellular phone, or BT compliant cellular phone) is brought into a compartment of a vehicle, and the cellular phone is under a state to be able to communicate with an in-vehicle handsfree apparatus mounted in the vehicle via the BT communications link.

Figure 1:
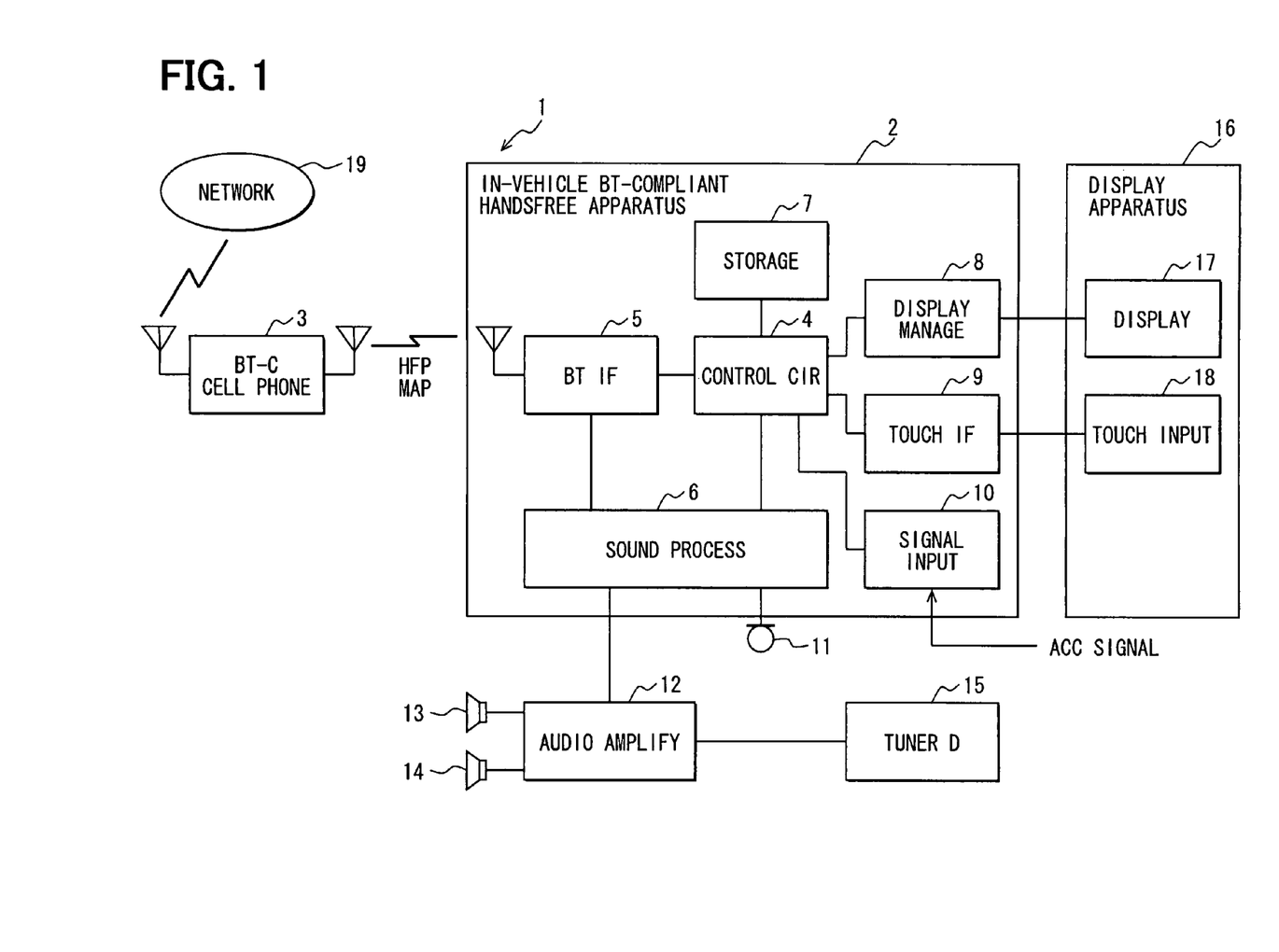
FIG. 1 is a functional block diagram according to an embodiment of the present invention.

The in-vehicle handsfree apparatus 2 and the cellular phone 3 are included in an in-vehicle handsfree system 1. It is noted that the cellular phone 3 may be one of several cellular phones 3. The in-vehicle handsfree apparatus 2 includes the following: a control circuit 4 (also referred to as a control means); a BT interface (IF) device 5 (also referred to as a communications link connecting means or device, or a protocol connecting means or device); a call sound processor 6 (also referred to as a call sound processing device); a storage device 7; a display management device 8; a touch input interface device 9; and a signal input device 10.

The control circuit 4 includes a known micro-computer having a CPU, RAM, ROM, I/O bus, etc., and controls an overall operation of the in-vehicle handsfree apparatus 2 such as a communications operation, and a data management operation. The BT interface device 5 has a function to execute BT communications with the cellular phone 3 while achieving a multi-connection or concurrent connection, which establishes simultaneous connection of HFP and MAP at the same time, in a state where the in-vehicle apparatus 2 and the cellular phone 3 are connected via a BT communications link (also referred to as a short range wireless communications link). The HFP is a handsfree profile for realizing a handsfree phone call while the MAP is a message access profile (MAP) for realizing a transfer of mail information concerning an electronic mail. Both the HFP and MAP are defined in the communications standard of BT.

Further, it is noted that an electronic mail or a mail is defined in the present application as a general term for transmission data such as a character (or text) message or image data exchanged in a known computer communications network. Moreover, the BT interface device 5 may be compliant with (i) a Phone Book Access Profile (PBAP) for realizing a transfer of phone book data, outgoing call history data, or incoming call history data, or (ii) an Object Push Profile (OPP) for realizing the various data transfers, in addition to the HFP and MAP. Herein, the above profiles signify communications protocols defined for every function.

The call sound processor 6 is connected with a microphone 11 and an audio amplifier 12. The microphone 11 is arranged at a position to easily collect user's utterance. The audio amplifier 12 is arranged outside of the in-vehicle handsfree apparatus 2 and connected with two speakers 13, 14. For example, the speaker 13 is arranged at the driver's seat door, while the speaker 14 is arranged at the front passenger door. In addition, the audio amplifier 12 is also connected to a tuner deck 15. For instance, the tuner deck 15 receives a musical tune sound from a storage medium for music, or a radio program from a radio station and outputs them to the audio amplifier 12. The audio amplifier 12 amplifies the received musical tune sound and the radio program, and outputs the amplified sounds via the speakers 13, 14.

The storage device 7 stores the various data while containing reception mail information area and transmission mail information area with respect to each of the several cellular phones 3 with which the BT interface device 5 establishes the BT communications link. The reception mail information storage area stores reception mail information including a reception date and time, a transmission source, a subject name, and a text body, concerning each reception mail which the corresponding cellular phone 3 receives via the communications network 19. The transmission mail information storage area stores transmission mail information including a transmission date and time, a transmission destination, a subject name, and a text body, concerning each transmission mail which the corresponding cellular phone 3 transmits via the communications network 19.

Moreover, in addition to the reception mail information storage area and the transmission mail information storage area, the storage device 7 further includes a phone book information storage area, an outgoing call history information storage area, and an incoming call history information storage area. For example, the phone book information storage area stores phone book information indicating correspondence between phone numbers and registration names. The outgoing call history information storage area stores outgoing call history information indicating correspondence between outgoing call clock times and destination phone numbers with respect to outgoing calls from the in-vehicle handsfree apparatus 2 or cellular phone 3, with which the in-vehicle handsfree apparatus 2 establishes the HFP connection (i.e., the connection of HFP). The incoming call history information storage area stores incoming call history information indicating correspondence between incoming call clock times and source phone numbers with respect to incoming calls to the cellular phone 3, with which the in-vehicle handsfree apparatus 2 establishes the HFP connection.

The signal input device 10 receives an accessory (ACC) signal from a key switch of the vehicle. When the ACC signal inputted from the key switch is in an ON state, i.e., the high level, the control circuit 4 causes the in-vehicle handsfree apparatus 2 to be in the power ON state. The in-vehicle battery is thus caused to supply operation power to all the functional blocks, which are thereby enabled to be in a usual operation state, i.e., a wake-up state. When the ACC signal inputted from the key switch is in an OFF state, i.e., the low level, the control circuit 4 causes the in-vehicle handsfree apparatus 2 to be in the power OFF state. The in-vehicle battery is thus caused to supply operation power to the limited functional blocks, which are thereby enabled to be in a low power consumption operation state, i.e., a sleep state.

A display apparatus 16 includes a display (screen) device 17 for displaying display windows, and a touch input device (i.e., touch sensitive panel) 18 forming a touch switch on the display window. The display management device 8 manages or controls a display window operation of the display device 17 in the display apparatus 16 based on a display command notice (also referred to signal), which is received from the control circuit 4. The touch input interface device 9 receives an operation detection notice (also referred to as signal) via the touch input device 18 according to the user having manipulated the touch switch presently formed on the display window. The touch input interface device 9 outputs the received touch detection notice to the control circuit 4. The control circuit 4 analyzes the received touch detection notice.

The control circuit 4 makes a determination as to whether the result of analyzing the touch detection notice indicates that the user performed a touch input via the touch input device 18 so as to display a text body or subject name of the mail information stored in the storage device 7. When the determination is affirmed, the control circuit 4 outputs a display instruction notice to the display management device 8 according to the result of analyzing the touch detection notice. Thus, the text body or subject name of the mail information specified by the user is displayed in the display device 17.

Moreover, under the above-mentioned configuration, the reception mail information storage area and transmission mail information storage area of the storage device 7 may have either a volatile character or non-volatile character. In the case of having the volatile character, the following arises. For example, to get off the vehicle, the user turns the ignition key to the OFF position. The control circuit 4 thus determines that the ACC signal inputted from the key switch is switched into the OFF state, thereby turning the operation power into the OFF state. The reception mail information and the transmission mail information, which have been stored just prior to the ACC signal turning into the OFF state, are erased without remaining in the memory state.

In contrast, in the case of having the non-volatile character, the following arises. For example, to get off the vehicle, the user turns the ignition key to the OFF position. The control circuit 4 thus determines that the ACC signal inputted from the key switch is switched into the OFF state. Even though the operation power is turned into the OFF state, the reception mail information and the transmission mail information, which have been stored just prior to the ACC signal turning into the OFF state, remain in the memory state without being erased.

The cellular phone 3 (i.e., each of the several cellular phones 3) includes a control circuit to control an overall operation of the cellular phone 3; a phone communications device to execute a phone call communication with the communications network 19; a BT interface device which executes BT communications; a key input device which arranges the various keys manipulated by the user; a storage device; a display device to display the various display windows; a microphone to input a sound which the user utters; and a speaker which outputs as a reception sound a sound received from a call partner. The storage device includes a reception mail information storage area, a transmission mail information storage area, and a phone book information storage area. The reception mail information storage area stores reception mail information concerning the reception mails which are received by the cellular phone 3 via the communications network 19. The transmission mail information storage area stores transmission mail information concerning the transmission mails which are transmitted by the cellular phone 3 via the communications network 19. The phone book information storage area stores phone book information indicating correspondence between phone numbers and registration names.

The BT interface device of the cellular phone 3 has a function to execute BT 15, communications with the in-vehicle handsfree apparatus 2 while responding to or complying with a profile communicable with the in-vehicle handsfree apparatus 2 depending on the models of the cellular phone 3. For instance, a first mode is compliant with (having the function to establish the connection of) both HFP and MAP while further having the function of establishing the concurrent connection of HFP and MAP. A second mode is compliant to both HFP and MAP without having the function of establishing the concurrent connection of HFP and MAP. A third mode is compliant only to HFP but not to MAP.

Further, in the state that the cellular phone 3 establishes the connection of HFP with the in-vehicle handsfree apparatus 1, the following arises. When a voice call incoming (also referred to as a voice call arrival) from the communications network 19 arises in the cellular phone 3, a voice call incoming notice indicating that the cellular phone 3 underwent the voice call incoming from the communications network 19 is outputted to the in-vehicle handsfree apparatus 2. When a mail incoming (also referred to as a mail arrival) from the communications network 19 arises in the cellular phone 3, a mail incoming notice indicating that the cellular phone 3 underwent the mail incoming from the communications network 19 is outputted to the in-vehicle handsfree apparatus 2. Moreover, the cellular phone 3 is configured to operate using, as an operation power, an electric power supplied from an internal battery which can be detachable from the main body of the cellular phone 3. It is noted that the communications network 19 includes a facility, which provides a known cellular phone communications service, such as a wireless base station, a base station control apparatus.

Figure 2:
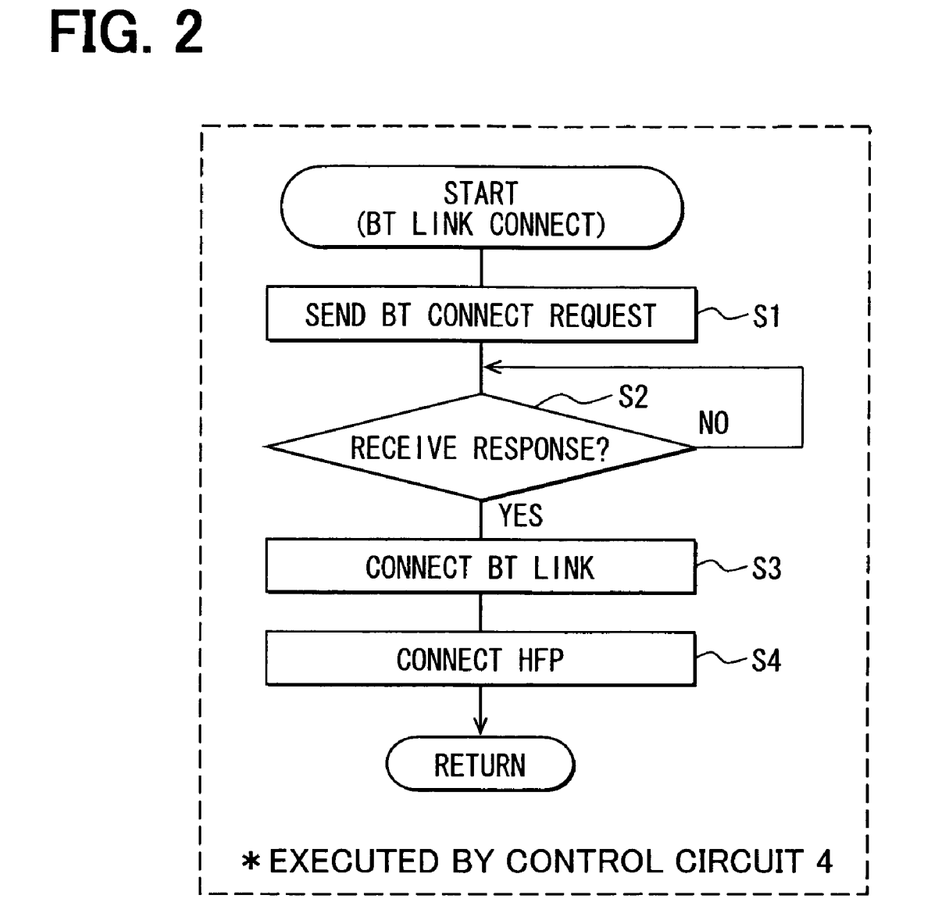
FIG. 2 is a flowchart illustrating a BT communications link connection process.
Figure 3:
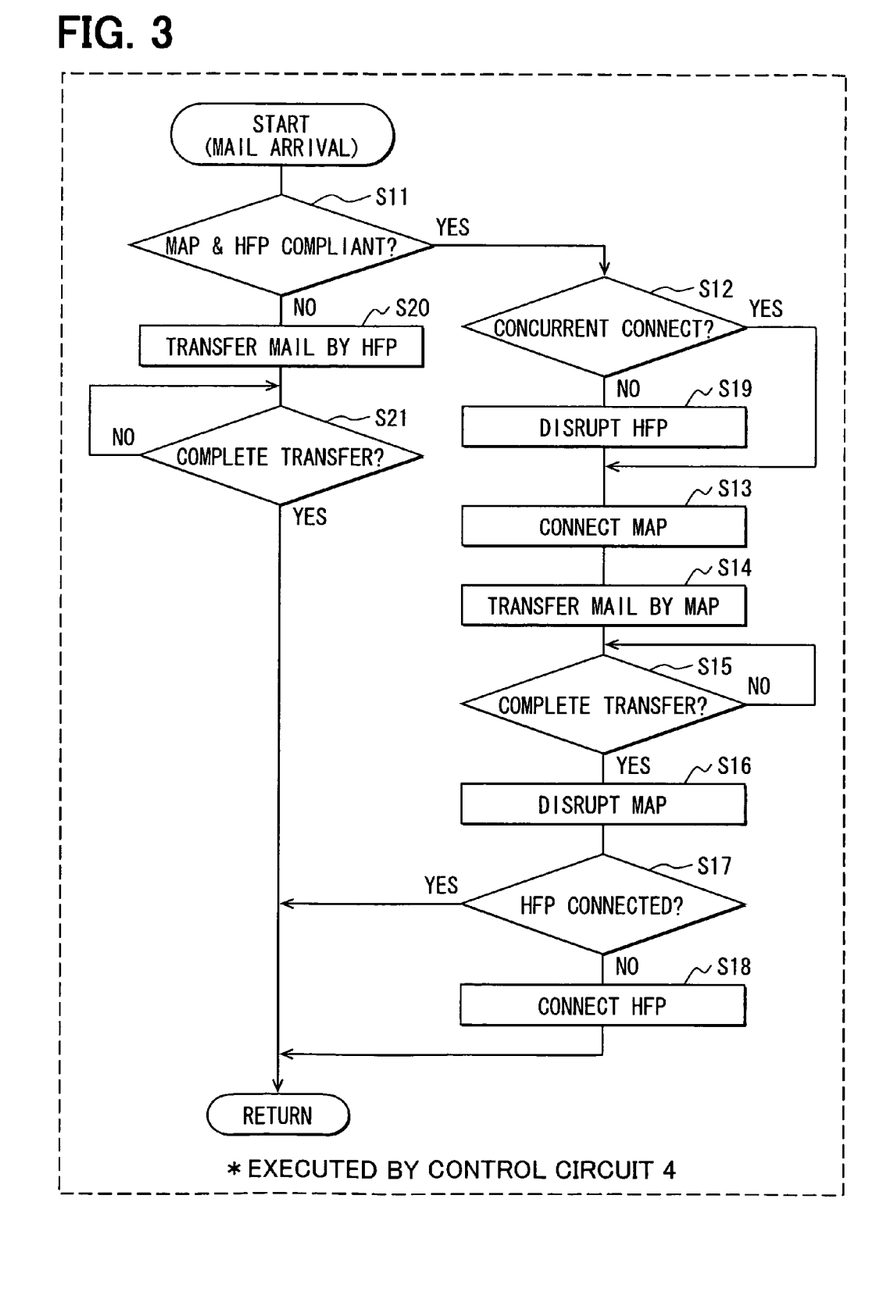
FIG. 3 is a flowchart illustrating a mail arrival process.
Figure 4:
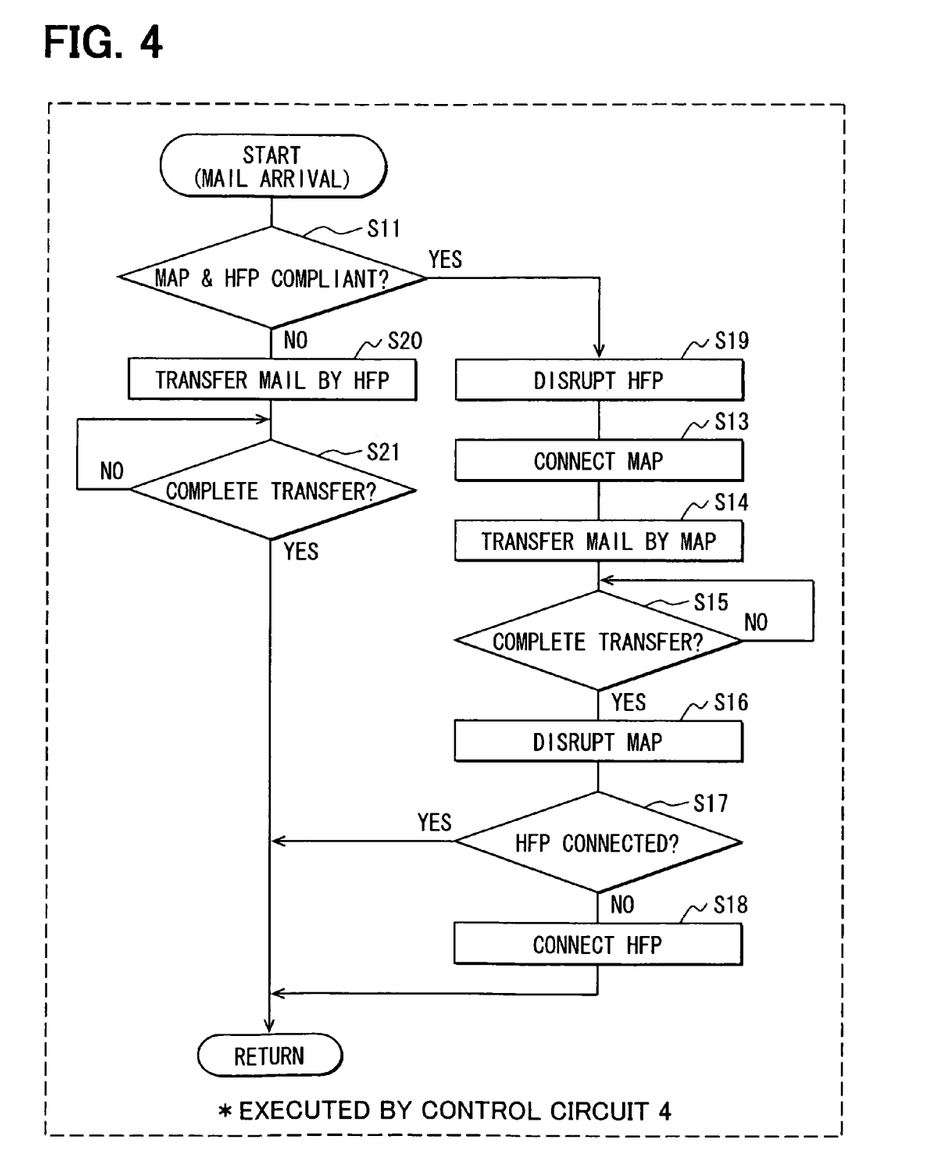
FIG. 4 is a flowchart illustrating another mail arrival process.

The above configuration provides an operation, which is explained with reference to FIGS. 2 to 4. FIG. 2 illustrates a flowchart of a BT communications link connection process executed by the in-vehicle handsfree apparatus 2, i.e., the control circuit 4. FIGS. 3, 4 illustrate flowcharts of a mail arrival process (also referred to as a mail incoming process) executed by the control circuit 4 of the in-vehicle handsfree apparatus 2. The following explains the BT communications link connection process and the mail arrival process in order.

The explanation is made under a premise that the cellular phone 3 and the in-vehicle handsfree apparatus 2 are both in the state that the BT communications link can be connected, i.e., that both are within a BT communications area.

(1) BT Communications Link Connection Process

As explained above, when the ACC signal inputted from the key switch is in the OFF state, the control circuit 4 causes the in-vehicle handsfree apparatus 2 to be in the power OFF state while causing the in-vehicle battery to supply an operation power to the limited functional blocks, thereby achieving a low power consumption operation state. Further, the control circuit 4 performs an ACC signal monitoring process to monitor whether the ACC signal is switched into the ON state. When the ACC signal inputted from the key switch is switched into the ON state, the control circuit 4 causes the in-vehicle handsfree apparatus 2 to be in the power ON state while causing the in-vehicle battery to supply an operation power to all the functional blocks, thereby achieving a usual operation state. Thus, the ACC signal monitoring process is switched into a main process; then, the BT communications link connection process illustrated in FIG. 2 is started as an interrupt process.

It is further noted that a flowchart or the processing of the flowchart in the present application includes sections (also referred to as steps), which are represented, for instance, as S1. Further, each section can be divided into several subsections while several sections can be combined into a single section. Furthermore, each of thus configured sections can be referred to as a means or unit and achieved not only as a software device but also as a hardware device.

As starting the BT communications link connection process, the control circuit 4 causes the BT interface device 5 to transmit (or send) a BT connection request to the cellular phone 3 (S1). The control circuit 4 waits for the BT interface device 5 to receive a BT connection response from the cellular phone 3 (S2). For instance, the control circuit 4 makes a determination at S2 as to whether the BT interface device 5 receives from the cellular phone 3 the BT connection response containing identification information, such as a BT address, which can identify the cellular phone 3. When the determination at S2 is affirmed, the BT communications link is connected between the BT interface device 5 and the cellular phone 3 (S3). In other words, the connection of the BT communications link is made between the BT interface device 5 and the cellular phone 3. Then, the connection of HFP for realizing the handsfree phone call is established (S4). The BT communications link connection process is then ended. The processing returns to the main process.

That is, after the BT communications link is connected or established between the BT interface device 5 and the cellular phone 3, the control circuit 4 makes the connection of HFP without making the connection of MAP even when the cellular phone 3 of a communications partner in the BT communications link is a mode responding to or compliant with both HFP and MAP. Without establishing the connection of MAP, the control circuit 4 waits for a voice call incoming or a mail incoming to the cellular phone 3 from the communications network 19. It is noted that the control circuit 4 analyzes the identification information included in the BT connection response to thereby identify the function of the cellular phone 3 which is a connection party of the BT communications link; the identification information is such as information about a profile complied by the cellular phone 3, or information about whether to enable the concurrent connection of profiles.

It is further noted that "to make connection of a protocol or profile" is equivalent to "to connect a protocol or profile."

(2) Mail Arrival Process

When receiving a mail incoming notice from the cellular phone 3 to thereby determine that a mail incoming from the communications network 19 arouse in the cellular phone 3, the control circuit 4 starts the mail arrival process illustrated in FIG. 3 as an interrupt process. As starting the mail arrival process, the control circuit 4 makes a determination as to whether the cellular phone 3 with which the BT interface device 5 establishes the connection of HFP is a model compliant with MAP (S11). When making an affirmative determination that the cellular phone 3 with which the BT interface device 5 establishes the connection of HFP is a model compliant with MAP (S11: YES), the control circuit 4 then makes a determination as to whether the cellular phone 3 compliant with MAP is a model which can make or establish the concurrent connection of profiles (S12).

Next when making an affirmative determination that the cellular phone 3 compliant with MAP is a model which can establish the concurrent connection of profiles (S12: YES), the control circuit 4 establishes between the BT interface device 5 and the cellular phone 3 the connection of MAP for realizing a mail transfer from the cellular phone 3 to the in-vehicle handsfree apparatus 2, while maintaining the connection of HFP, which has been established up to the present time without being disrupted (S13).

Subsequently, the control circuit 4 causes the cellular phone 3 to start a data transfer of reception mail information which is the mail information regarding the electronic mail arriving from the communications network 19 using a data transfer function specified in MAP (S14). Subsequently, the control circuit 4 makes a determination as to whether the transfer of the mail information from the cellular phone 3 is completed (S15). When making an affirmative determination that the transfer of the mail information from the cellular phone 3 is completed (S15: YES), the control circuit 4 disrupts the connection of MAP, which has been established up to the present time between the BT interface device 5 and the cellular phone 3 (S16).

Subsequently, the control circuit 4 makes a determination as to whether the connection of HFP is established at the present time between the BT interface device 5 and the cellular phone 3 (S17). When making an affirmative determination that the connection of HFP is established at the present time between the BT interface device 5 and the cellular phone 3 (S17: YES), the control circuit 4 ends the mail arrival process, thereby returning the processing to the main process. In contrast, when making a negative determination that the connection of HFP is not established at the present time between the BT interface device 5 and the cellular phone 3 (S17: NO), the control circuit 4 makes the connection of HFP between the BT interface device 5 and the cellular phone 3 (S18).

That is, the control circuit 4 returns the processing to the state to wait for a voice call incoming and a mail incoming under the condition just prior to the start of the mail arrival process, i.e., under the condition that the connection of HFP is established. The control circuit 4 then ends the mail arrival process, thereby returning the processing to the main process.

Further, when making a negative determination that the cellular phone 3 compliant with MAP is not a model which can establish the concurrent connection of profiles (S12: NO), the control circuit 4 disrupts the connection of HFP, which has been established up to the present time between the BT interface device 5 and the cellular phone 3 (S19). The control circuit 4 then makes the connection of MAP for realizing the mail transfer from the cellular phone 3 to the in-vehicle handsfree apparatus 2 (S13), thereby executing the processing from S13.

When making a negative determination that the cellular phone 3 with which the BT interface device 5 establishes the connection of HFP is not a model compliant with MAP (S11: NO), the control circuit 4 causes the cellular phone 3 to start a data transfer of the mail information regarding the electronic mail arriving from the communications network 19 using a data transfer function specified in HFP (S20). Subsequently, the control circuit 4 makes a determination as to whether the transfer of the mail information from the cellular phone 3 is completed (S21). When making an affirmative determination that the transfer of the mail information from the cellular phone 3 is completed (S21: YES), the control circuit 4 ends the mail arrival process, thereby returning the processing to the main process.

The above explains the following configuration: making a first determination as to whether the cellular phone 3 with which the connection of HFP is established is a model compliant with MAP; when affirmatively making the first determination, making a second determination as to whether the cellular phone 3 compliant with MAP is a model which can establish the concurrent connection of profiles; and when affirmatively making the second determination, making the connection of MAP while maintaining the connection of HFP, which has been established up to the present time between the BT interface device 5 and the cellular phone 3 without being disrupted. In contrast, as shown in FIG. 4, alternative flowchart can be adopted as the following configuration: without making the second determination as to whether the cellular phone 3 compliant with MAP is a model which can establish the concurrent connection of profiles, i.e., regardless of whether or not the cellular phone 3 compliant with MAP is a model to enable the concurrent connection of profiles, disrupting the connection of HFP, which has been established up to the present time between the BT interface device 5 and the cellular phone 3; making the connection of MAP for realizing the mail transfer from the cellular phone 3 to the in-vehicle handsfree apparatus 2; and executing the processing from S13.

As described above, the control circuit 4 can select, as a transfer of mail information concerning an electronic mail arriving at the cellular phone 3 from the communications network 19, either (i) the data transfer function specified by MAP or (ii) the data transfer function specified by HFP. It is noted that the data transfer function specified by MAP excels the data transfer function specified by HFP.

As the explained above, the in-vehicle handsfree apparatus 2 according to the present embodiment is provided as follows. Just posterior to a time when establishing the BT communications link with the cellular phone 3, the connection of HFP is made while the connection of MAP is not made; if the cellular phone 3 undergone the mail incoming or mail arrival is a model compliant with MAP, the connection of MAP is made and the transfer of the mail information from the cellular phone 3 is enabled using the data transfer function of MAP based on as a start trigger an event that a mail incoming from the communications network 19 arises in the cellular phone 3. Thus, the power consumption can be reduced in both the cellular phone 3 and the in-vehicle handsfree apparatus 2 by the amount corresponding to an event that the connection of MAP is not established immediately after establishing the BT communications link with the cellular phones 3. Further, the connection of MAP is made based on as a start trigger an event that the arrival of the mail from the communications network 19 occurred in the cellular phone 3. The mail information concerning the electronic mail arriving at the cellular phone 3 from the communications network 19 can be appropriately transmitted from the cellular phone 3.

Moreover, it the cellular phone 3 undergoing the arrival of the mail is a model which is enabled to establish the concurrent connection of the profiles, the connection of MAP is made while maintaining the connection of HFP without disrupting it. Thus, even while the connection of MAP is established, the function provided by HFP can be available.

Moreover, if the cellular phone 3 undergoing the arrival of the mail is a model which is disabled to establish the concurrent connection of the profiles, the connection of HFP is disrupted and the connection of MAP is then made. Under such a configuration, the mail information concerning the electronic mail arriving at the cellular phone 3 from the communications network 19 can be appropriately transferred from the cellular phone 3 with respect to a model, which is disabled to establish the concurrent connection of the profiles. Moreover, in such a case, the power consumption can be further reduced in both the cellular phone 3 and the in-vehicle handsfree apparatus 2 by the amount corresponding to an event or period that the connection of HFP is disrupted.

Further, if the cellular phone 3 undergone the mail incoming or mail arrival is a model not compliant with MAP, the connection of HFP is maintained without being disrupted. Thus, the transfer of the mail information from the cellular phone 3 is enabled using the data transfer function of HFP. Under such a configuration, the mail information concerning the electronic mail arriving at the cellular phone 3 from the communications network 19 can be appropriately transferred from the cellular phone 3 with respect to a model, which is not compliant with MAP.

The present invention is not limited only to the above-mentioned embodiment, and can be modified or extended as follows. The mail operation apparatus with a short range wireless communications function need not be limited to the in-vehicle handsfree apparatus 2, but also any apparatus having a function of treating mail information. For example, it may be another in-vehicle apparatus such as an in-vehicle navigation apparatus. It does not need to be limited to an in-vehicle apparatus mounted in a vehicle. Alternatively, it can be applied to a portable apparatus which the user can carry or a stationary apparatus which the user cannot carry.

Each or any combination of processes, functions, sections, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

Aspects of the disclosure described herein are set out in the following clauses.

As an aspect of the disclosure, a mail operation apparatus with a short range communications function is provided as follows. A communications link connecting device is configured that makes connection of a short range wireless communications link with a cellular phone. A protocol connecting device is configured that makes, with the cellular phone, connection of a plurality of protocols under a condition that the short range communications link is made between the communications link connecting device and the cellular phone, the plurality of protocols including a mail transfer protocol to enable a transfer of mail information of a mail which the cellular phone receives from a communications network. A control circuit is configured that controls making and disrupting of the connection of the plurality of protocols between the protocol connecting device and the cellular phone. Herein, the control circuit is further configured, (i) immediately after the short range wireless communications link is made between the communications link connecting device and the cellular phone, to make connection of an other protocol other than the mail transfer protocol between the protocol connecting device and the cellular phone without making the connection of the mail transfer protocol between the protocol connecting device and the cellular phone, and (ii) when a start trigger then occurs in the cellular phone posterior to the making the connection of the other protocol, the start trigger being an arrival of a mail from the communications network, to make connection of the mail transfer protocol between the protocol connecting device and the cellular phone, thereby enabling a transfer of mail information of the mail from the cellular phone using a data transfer function of the mail transfer protocol, if the cellular phone undergoing the arrival of the mail is a model compliant with the mail transfer protocol.

As an optional aspect of the disclosure, the control circuit may be further configured, when the start trigger then occurs in the cellular phone posterior to the making the connection of the other protocol, the start trigger being the arrival of the mail from the communications network, to make connection of the mail transfer protocol between the protocol connection device and the cellular phone while maintaining, without disrupting, the connection of the other protocol made between the protocol connection device and the cellular phone, thereby enabling a transfer of the mail information from the cellular phone using the data transfer function of the mail transfer protocol if the cellular phone undergoing the arrival of the mail is a model, which is compliant with the mail transfer protocol and enabled to make concurrent connection of a plurality of protocols.

Under such a configuration, the connection of the other protocol established with the cellular phone is maintained without being disrupted. Thus, even while the connection of the mail transfer protocol is made, the function of the other protocol can be provided.

As an optional aspect of the disclosure, the control circuit may be further configured, when the start trigger then occurs in the cellular phone posterior to the making the connection of the other protocol, the start trigger being the arrival of the mail from the communications network, to make connection of the mail transfer protocol between the protocol connection device and the cellular phone after disrupting the connection of the other protocol made between the protocol connection device and the cellular phone, thereby enabling a transfer of the mail information from the cellular phone using the data transfer function of the mail transfer protocol if the cellular phone undergoing the arrival of the mail is a model, which is compliant with the mail transfer protocol and disabled to make concurrent connection of a plurality of protocols.

Under such a configuration, the established connection of the other protocol with the cellular phone is disrupted. With respect to the model which does not have the function of the concurrent connection of the protocols, the mail information concerning the electronic mail arriving at the cellular phone from the communications network can be thus appropriately transmitted from the cellular phone to the mail operation apparatus. The power consumption can be thus suppressed in both the cellular phone and the mail operation apparatus by the amount corresponding to the event that the other protocol is disrupted.

As an optional aspect of the disclosure, the control circuit may be further configured, when the start trigger then occurs in the cellular phone posterior to the making the connection of the other protocol, the start trigger being the arrival of the mail from the communications network, to maintain, without disrupting, the connection of the other protocol being made between the protocol connection device and the cellular phone, thereby enabling a transfer of the mail information from the cellular phone using the data transfer function of the other protocol if the cellular phone undergoing the arrival of the mail is a model not compliant with a mail transfer protocol.

Thus, with respect to the model which is not compliant with the mail transfer protocol, the mail information concerning the electronic mail arriving at the cellular phone from the communications network can be thus appropriately transmitted from the cellular phone to the mail operation apparatus.

As an optional aspect of the disclosure, the protocol connecting device may be further configured, under a condition that the short range communications link is made between the communications link connecting device and the cellular phone, to make connection of, as the other protocol, a handsfree phone call protocol with the cellular phone for realizing a handsfree phone call.

Thereby, the handsfree phone call function can be provided immediately after the short range wireless communications link is connected with the cellular phone.

It will be obvious to those skilled in the art that various changes may be made in the above-described embodiments of the present invention. However, the scope of the present invention should be determined by the following claims.

What is claimed is:

1. A mail operation apparatus with a short range communications function, the apparatus comprising:
    a communications link connecting device that makes connection of a short range wireless communications link with a cellular phone;
    a protocol connecting device that makes, with the cellular phone, connection of a plurality of protocols under a condition that the short range communications link is made between the communications link connecting device and the cellular phone, the plurality of protocols including a mail transfer protocol to enable a transfer of mail information of a mail which the cellular phone receives from a communications network; and
    a control circuit that controls making and disrupting of the connection of the plurality of protocols between the protocol connecting device and the cellular phone,
    the control circuit being further configured,
    (i) immediately after the short range wireless communications link is made between the communications link connecting device and the cellular phone,
    to make connection of an other protocol other than the mail transfer protocol between the protocol connecting device and the cellular phone without making the connection of the mail transfer protocol between the protocol connecting device and the cellular phone, and
    (ii) when a start trigger then occurs in the cellular phone posterior to the making the connection of the other protocol, the start trigger being an arrival of a mail from the communications network,
    to make connection of the mail transfer protocol between the protocol connecting device and the cellular phone, thereby enabling a transfer of mail information of the mail from the cellular phone using a data transfer function of the mail transfer protocol, if the cellular phone undergoing the arrival of the mail is a model compliant with the mail transfer protocol.

2. The mail operation apparatus according to claim 1,
the control circuit being further configured,
when the start trigger then occurs in the cellular phone posterior to the making the connection of the other protocol, the start trigger being the arrival of the mail from the communications network,
to make connection of the mail transfer protocol between the protocol connection device, and the cellular phone while maintaining, without disrupting, the connection of the other protocol made between the protocol connection device and the cellular phone, thereby enabling a transfer of the mail information from the cellular phone using the data transfer function of the mail transfer protocol if the cellular phone undergoing the arrival of the mail is a model, which is compliant with the mail transfer protocol and enabled to make concurrent connection of a plurality of protocols.

3. The mail operation apparatus according to claim 1,
the control circuit being further configured,
when the start trigger then occurs in the cellular phone posterior to the making the connection of the other protocol, the start trigger being the arrival of the mail from the communications network,
to make connection of the mail transfer protocol between the protocol connection device and the cellular phone after disrupting the connection of the other protocol made between the protocol connection device and the cellular phone, thereby enabling a transfer of the mail information from the cellular phone using the data transfer function of the mail transfer protocol if the cellular phone undergoing the arrival of the mail is a model, which is compliant with the mail transfer protocol and disabled to make concurrent connection of a plurality of protocols.

4. The mail operation apparatus according to claim 1,
the control circuit being further configured,
when the start trigger then occurs in the cellular phone posterior to the making the connection of the other protocol, the start trigger being the arrival of the mail from the communications network,
to maintain, without disrupting, the connection of the other protocol being made between the protocol connection device and the cellular phone, thereby enabling a transfer of the mail information from the cellular phone using the data transfer function of the other protocol if the cellular phone undergoing the arrival of the mail is a model not compliant with a mail transfer protocol.

5. The mail operation apparatus according to claim 1,
the protocol connecting device being further configured,
under a condition that the short range communications link is made between the communications link connecting device and the cellular phone,
to make connection of, as the other protocol, a handsfree phone call protocol with the cellular phone for realizing a handsfree phone call.

6. A method executed by a control circuit of an in-vehicle handsfree apparatus with a short range communications function,
the handsfree apparatus having:
a communications link connecting device that makes connection of a short range wireless communications link with a cellular phone;
a protocol connecting device that makes, with the cellular phone, connection of a plurality of protocols under a condition that the short range communications link is made between the communications link connecting device and the cellular phone, the plurality of protocols including a mail transfer protocol to enable a transfer of mail information of a mail which the cellular phone receives from a communications network; and
a control circuit that controls making and disrupting of the connection of the plurality of protocols between the protocol connecting device and the cellular phone,
the method comprising:
making connection of a handsfree phone call protocol other than the mail transfer protocol between the protocol connecting device and the cellular phone without making the connection of the mail transfer protocol between the protocol connecting device and the cellular phone immediately after the short range wireless communications link is made between the communications link connecting device and the cellular phone, and
making, if the cellular phone undergoing the arrival of the mail is a model compliant with the mail transfer protocol, connection of the mail transfer protocol between the protocol connecting device and the cellular phone when a start trigger occurs in the cellular phone posterior to the making the connection of the handsfree phone call protocol, the start trigger being an arrival of a mail from the communications network, thereby enabling a transfer of mail information of the mail from the cellular phone using a data transfer function of the mail transfer protocol.

* * * * *